United States Patent
Koda et al.

(10) Patent No.: US 11,162,363 B2
(45) Date of Patent: Nov. 2, 2021

(54) STEAM TURBINE SYSTEM

(71) Applicant: MITSUBISHI HEAVY INDUSTRIES COMPRESSOR CORPORATION, Tokyo (JP)

(72) Inventors: Takuro Koda, Hiroshima (JP); Kazuaki Sugimoto, Hiroshima (JP); Akito Kunimoto, Hiroshima (JP); Tomoaki Nogami, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 44 days.

(21) Appl. No.: 16/773,316

(22) Filed: Jan. 27, 2020

(65) Prior Publication Data

US 2020/0240271 A1    Jul. 30, 2020

(30) Foreign Application Priority Data

Jan. 30, 2019    (JP) .............................. JP2019-014632

(51) Int. Cl.
*F01D 1/02* (2006.01)
*F01D 17/20* (2006.01)
*F01D 25/24* (2006.01)

(52) U.S. Cl.
CPC .............. *F01D 1/023* (2013.01); *F01D 17/20* (2013.01); *F01D 25/24* (2013.01);
(Continued)

(58) Field of Classification Search
CPC .......... F01D 17/20; F01D 1/023; F01D 25/24; F01K 7/20; F05B 2260/233; F05D 2220/31; F05D 2270/301; Y02P 80/15
See application file for complete search history.

(56) References Cited

U.S. PATENT DOCUMENTS 2,095,860 A    10/1937   Ericson
4,118,935 A *  10/1978   Andersson ................ F01K 7/20
                                                             290/40 R
(Continued)

FOREIGN PATENT DOCUMENTS

CH    291603 A    6/1953
DE    437693 C   11/1926
(Continued)

OTHER PUBLICATIONS

European Search Report in corresponding European Application No. 20152406.3, dated Jun. 18, 2020 (7 pages).

*Primary Examiner* — Jesse S Bogue
(74) *Attorney, Agent, or Firm* — Osha Bergman Watanabe & Burton LLP

(57) ABSTRACT

A steam turbine system 1 includes a steam turbine 10 including a plurality of rotor blades 16; a first mixed steam supply pipe 21 that supplies the steam, which is supplied from a steam supply source 40 capable of supplying the steam with fluctuating pressure, to an upstream stage Sa within the casing 11; a second mixed steam supply pipe 22 that supplies the steam to the second stepped part Sb; an adjusting unit 25 that adjusts a flow rate of the steam supplied to the first stepped part Sa and the second stepped part Sb; and a control unit 30 that controls the adjusting unit 25 on the basis of a differential pressure between a pressure P0 of the steam supplied from the steam supply source 40 and a pressure in the first stepped part Sa.

4 Claims, 5 Drawing Sheets

(52) U.S. Cl.
CPC .... *F05B 2260/233* (2013.01); *F05D 2220/31* (2013.01); *F05D 2270/301* (2013.01)

(56) References Cited

U.S. PATENT DOCUMENTS

| | | | | |
|---|---|---|---|---|
| 4,258,424 | A * | 3/1981 | Giras | F01D 17/04 60/660 |
| 8,505,299 | B2 * | 8/2013 | Mundra | F01D 17/18 60/660 |
| 2011/0074620 | A1 | 3/2011 | Wintermantel | |
| 2012/0011852 | A1 | 1/2012 | Mundra et al. | |
| 2013/0312410 | A1 * | 11/2013 | Herzog | F01K 7/08 60/641.8 |
| 2014/0328673 | A1 * | 11/2014 | Tamaoki | F02C 9/20 415/149.1 |

FOREIGN PATENT DOCUMENTS

| | | |
|---|---|---|
| DE | 102017213280 A1 | 2/2019 |
| FR | 412370 A | 7/1910 |
| GB | 339219 A | 12/1930 |
| JP | H09303109 A | 11/1997 |
| WO | 2010/000216 A1 | 1/2010 |

\* cited by examiner

STEAM TURBINE SYSTEM

BACKGROUND OF THE INVENTION

Field of the Invention

The present invention relates to a steam turbine system.
Priority is claimed on Japanese Patent Application No. 2019-014632, filed Jan. 30, 2019, the content of which is incorporated herein by reference.

Description of Related Art

In steam turbines, some steam turbines supply steam (mixed steam) thereinto separately from main steam. For example, Japanese Unexamined Patent Application Publication No. H09-303109 discloses a configuration in which a plurality of mixed steam ports connected to a mixed steam source are separately provided on an upstream side and a downstream side of a steam turbine. In this configuration, during a low-load operation in which the internal pressure of the turbine is low, mixed steam is supplied from a mixed steam port on a high-pressure side on the upstream side. During a high-load operation in which the internal pressure of the turbine is high, the mixed steam is supplied from a mixed steam port on a low-pressure side on the downstream side. In such a configuration, the mixed steam is efficiently supplied by switching a mixed steam port that is configured to supply the mixed steam depending on the internal pressure of a turbine.

SUMMARY OF THE INVENTION

Meanwhile, steam supply sources, which supply the steam to the steam turbine as the mixed steam, are, for example, various facilities installed in plants or factories. The pressure of the steam supplied from a steam supply source to the steam turbine fluctuates depending on the operation status of the facilities or the like. If the differential pressure between the pressure of the steam supplied from the steam supply source and the pressure within the steam turbine is small, the steam does not easily flow into the steam turbine.

On the other hand, in a configuration disclosed in Japanese Unexamined Patent Application Publication No. H09-303109 in which the switching of the mixed steam port is performed depending on the internal pressure of the turbine, it is not possible to cope with the fluctuation of the pressure of the steam supplied from the steam supply source.

The invention provides a steam turbine capable of smoothly performing the supply of steam and performing the efficient operation even if the fluctuation of the pressure of the steam supplied from a steam supply source.

A steam turbine system according to a first aspect of the invention includes a steam turbine including rotor a plurality of rotor blades that are configured to rotate around a rotating shaft with steam within a casing and are arranged at intervals in a central axis direction of the rotating shaft so as to form a plurality of stages; a first mixed steam supply pipe that is configured to supply the steam, which is supplied from a steam supply source allowing supply of the steam with fluctuating pressure, to an upstream stage within the casing; a second mixed steam supply pipe that is provided to branch from the first mixed steam supply pipe and is configured to supply the steam to a downstream stage located on a downstream side with respect to the upstream stage within the casing; an adjusting unit that is configured to adjust a flow rate of the steam supplied from the first mixed steam supply pipe to the upstream stage and a flow rate of the steam supplied from the second mixed steam supply pipe to the downstream stage; a detection unit that is configured to detect a differential pressure between a pressure of the steam supplied from the steam supply source and a pressure in the upstream stage; and a control unit that is configured to control the adjusting unit on the basis of the differential pressure detected by the detection unit.

According to such a configuration, it is possible to adjust whether a steam supply destination is the upstream stage or the downstream stage on the basis of the differential pressure between the pressure of the steam supplied from the steam supply source and the pressure in the upstream stage. In a case where the differential pressure between the pressure of the steam supplied from the steam supply source and the pressure within the casing in the upstream stage is small, the steam does not easily flow into the upstream stage. The pressure within the casing in the downstream stage is lower than that in the upstream stage. Thus, in the downstream stage, the differential pressure between the pressure of the steam supplied from the steam supply source is larger than that in the upstream stage. Hence, if the steam is supplied to the downstream stage, the steam easily flows into the casing. On the other hand, in a case where the differential pressure between the pressure of the steam supplied from the steam supply source and the pressure within the casing in the upstream stage is sufficiently large, the steam easily flows into the upstream stage. In this case, by supplying the steam to the upstream stage on the upstream side of the downstream stage, the amount of work of the steam within the casing can be increased and the efficiency of the operation can be enhanced. In this way, even if the pressure of the mixed steam supplied from the mixed steam source fluctuates, it is possible to smoothly perform the supply of the mixed steam and to perform the efficient operation.

Additionally, in the steam turbine system according to a second aspect of the invention, in the first aspect, the adjusting unit may be a valve that is configured to switch a flow state of the steam that flows through the second mixed steam supply pipe.

By adopting such a configuration, by closing the valve, the steam does not easily flow to the second mixed steam supply pipe, and the steam from the steam supply source is supplied to the upstream stage through the first mixed steam supply pipe. Conversely, by opening the valve, the steam from the steam supply source is supplied to the downstream stage with low pressure through the second mixed steam supply pipe. In this way, by virtue of a simple configuration including the valve, switching of the steam supply destination based on the differential pressure can be easily performed. As a result, the function of adjusting the flow rate of the steam supplied to the upstream stage and the downstream stage in the adjusting unit can be easily realized.

Additionally, in the steam turbine system according to a third aspect of the invention, in the first aspect or the second aspect, a check valve that is provided in the first mixed steam supply pipe to prevent a backflow of the steam from an inside of the casing may be included.

By adopting such a configuration, outflow (backflow) of the steam from the upstream stage in which the pressure within the casing is higher than in the downstream stage via the first mixed steam supply pipe to the downstream stage in a state where the steam is supplied to the downstream stage through the second mixed steam supply pipe can be suppressed.

Additionally, in the steam turbine system according to a fourth aspect of the invention, in any one of the first aspect to the third aspect, the control unit may control the adjusting unit so as to increase the flow rate of the steam supplied from the second mixed steam supply pipe to the downstream stage in a case where the differential pressure is smaller than a predetermined reference value.

By adopting such a configuration, a case where the differential pressure between the pressure of the steam supplied from the steam supply source and the pressure within the casing in the upstream stage is small and the steam does not easily flow into the upstream stage can be appropriately determined. Then, the steam supply destination is switched from the upstream stage to the downstream stage. As a result, the steam can be supplied to the downstream stage and the mixed steam can be caused to efficiently continue flowing into the casing.

Additionally, in the steam turbine system according to a fifth aspect of the invention, in the fourth aspect, the reference value may be determined on the basis of correlation data that is preset on the basis of a relationship between a flow rate of the steam supplied from the steam supply source and a differential pressure required to supply the steam of the flow rate into the casing.

By adopting such a configuration, it is possible to reliably secure a differential pressure required to supply the steam of the flow rate into the casing depending on the flow rate of the steam supplied from the steam supply source. Accordingly, the steam supplied from a steam supply source can be caused to smoothly flow (supplied) into the casing.

According to the invention, even if the pressure of the steam supplied from the steam supply source fluctuates, it is possible to smoothly perform the supply of the steam to perform the efficient operation.

DETAILED DESCRIPTION OF THE INVENTION

Figure 1:
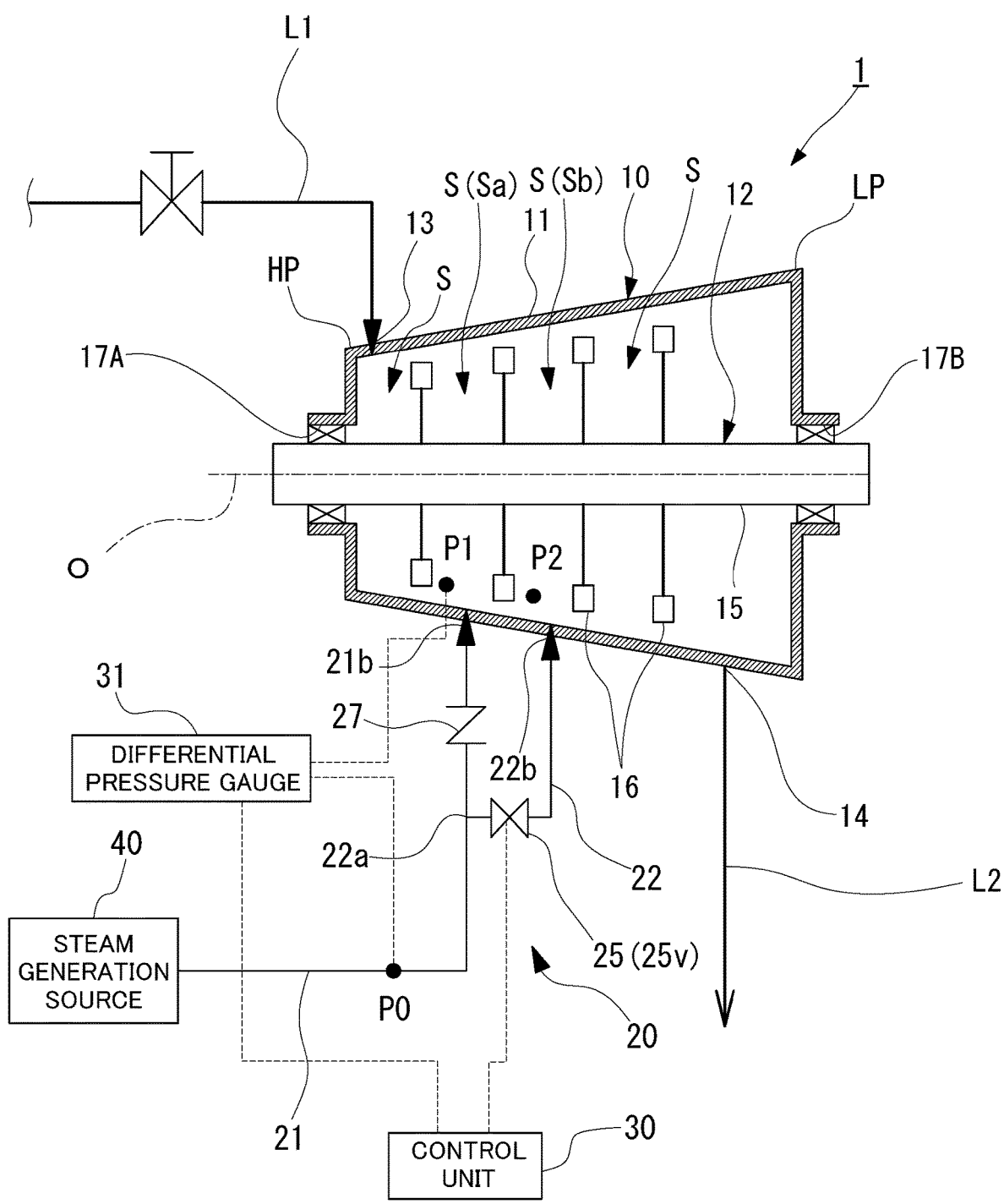
FIG. 1 is a view showing a schematic configuration of a steam turbine system in an embodiment of the invention.

Hereinafter, an embodiment for carrying out a steam turbine system according to the invention will be described with reference to the accompanying drawings. However, the invention is not limited only to the embodiment. FIG. 1 is a view showing a schematic configuration of the steam turbine system in the embodiment of the invention. As shown in FIG. 1, the steam turbine system 1 mainly includes a steam turbine 10, a mixed steam supply unit 20, and a control unit 30.

The steam turbine 10 includes a casing 11 and a rotor 12. The casing 11 has a tubular shape that extends in the direction of a central axis O in which the central axis O of the rotor 12 extends. The casing 11 includes a steam inlet 13 provided on one side (a first side, an upstream side) in the direction of the central axis O, and a steam outlet 14 provided on the other side (a second side, a downstream side) in the direction of the central axis O. A steam supply line L1 is connected to the steam inlet 13. The steam inlet 13 allows main steam (steam) generated in a boiler (not shown) to be supplied thereto through the steam supply line L1. A steam discharge line L2 is connected to the steam outlet 14. The steam outlet 14 discharges the steam in the casing 11 through the steam discharge line L2.

The rotor 12 includes a rotating shaft 15 and a rotor blade 16. The rotating shaft 15 has both ends supported by a first bearing 17A and a second bearing 17B so as to be rotatable around the central axis O. The rotating shaft 15 is housed inside the casing 11.

The rotor blades 16 are provided in a plurality of stages at intervals in the direction of the central axis O of the rotating shaft 15. Each rotor blade 16 is provided on an outer circumferential surface of the rotating shaft 15 so as to extend radially outward.

In such a steam turbine 10, the steam (main steam) generated in the boiler, which is a main steam supply source, is introduced from the steam inlet 13 via the steam supply line L1 into the casing 11. The main steam supplied from the steam inlet 13 flows into the uppermost stream side within the casing 11. Inside the casing 11, the steam flows from the steam inlet 13 side toward the lowermost stream side within the casing 11 to the steam outlet 14 side. If this steam collides against the rotor blade 16 of each stage of the rotor 12, the rotor blade 16 is rotationally driven around the central axis O together with the rotating shaft 15. The steam, which has reached at the steam outlet 14 of the casing 11, is discharged to the outside of the casing 11 through the steam discharge line L2. Within the casing 11, the pressure of the steam gradually decreases from the upstream steam inlet 13 toward the downstream steam outlet 14. That is, within the casing 11, a side (left side in FIG. 1) close to the steam inlet 13 in the direction of the central axis O is a high-pressure side HP, and a side (right side in the drawing) close to the steam outlet 14 in the direction of the central axis O is a low-pressure side LP.

Within the casing 11, a stator blade (not shown) is provided between the rotor blades 16 that are adjacent to each other in the direction of the central axis O. A set of a rotor blade 16 and a stator blade adjacent to an upstream side of the rotor blade 16 forms one stepped part S. The steam turbine 10 of the present embodiment has a plurality of (for example, four) the stepped parts S. The pressure of the steam within the casing 11 in the plurality of stepped parts S gradually decreases from the high-pressure side HP toward the low-pressure side LP.

The mixed steam supply unit 20 supplies the steam (hereinafter, this is referred to as mixed steam) supplied from the steam supply source 40, to a first stepped part (upstream stage) Sa and a second stepped part (downstream stage) Sb among the plurality of stepped parts S within the casing 11. Here, the first stepped part Sa is located on an upstream side (a side close to the high-pressure side HP) in a flow direction of the steam within the casing 11 with respect to the second stepped part Sb. Additionally, the first stepped part Sa is located on a downstream side (a side close to the low-pressure side LP) via at least one stepped part S with respect to a space connected to the steam inlet 13. That is, the first stepped part Sa is located in the middle of the casing 11 in the direction of the central axis O within the casing 11.

It is preferable that the first stepped part Sa is provided at a position where a differential pressure (a differential pressure from the mixed steam supplied from the steam supply source 40) required to cause the mixed steam of a flow rate when the most efficient operation is performed in the steam turbine 10 to flow into the casing 11 can be secured. For example, the first stepped part Sa is, for example, a second stepped part from the steam inlet 13.

Additionally, the second stepped part Sb is located on the upstream side via at least one stepped part S with respect to a space connected to the steam outlet 14. It is preferable that the second stepped part Sb is provided at a position where a differential pressure required to cause the mixed steam of a maximum flow rate required for the steam turbine 10 to flow into the casing 11 can be secured. In the present embodiment, the first stepped part Sa and the second stepped part Sb are the stepped parts S that are adjacent to each other in the direction of the central axis O with one rotor blade 16 interposed therebetween.

Steam is generated in the steam supply source 40. The steam supply source 40 is capable of supplying the generated steam to other apparatuses including the steam turbine 10. The steam supply source 40 is, for example, various facilities that discharge steam within plants or factories, facilities that generate the steam (so-called factory steam) for being used within plants or factories, piping through which factory steam flows, or the like. The mixed steam supplied from the steam supply source 40 fluctuates in pressure and flow rate depending on the usage status of facilities or the like. The pressure or flow rate of the mixed steam cannot be adjusted in the steam turbine 10.

The mixed steam supply unit 20 supplies the steam from the steam supply source 40, to the steam turbine 10. The mixed steam supply unit 20 includes a first mixed steam supply pipe 21 and a second mixed steam supply pipe 22.

The first mixed steam supply pipe 21 supplies the mixed steam, which is supplied from the steam supply source 40, to the first stepped part Sa within the casing 11. The first mixed steam supply pipe 21 is connected to the casing 11 at a position that faces a radially outer side of the first stepped part Sa.

The second mixed steam supply pipe 22 supplies the mixed steam, which is supplied from the steam supply source 40, to the second stepped part Sb located on the downstream side than the first stepped part Sa of the casing 11. The second mixed steam supply pipe 22 is provided to branch from the middle of the first mixed steam supply pipe 21. The second mixed steam supply pipe 22 is connected to the casing 11 at a position that faces a radially outer side of the second stepped part Sb.

The second mixed steam supply pipe 22 is provided with an adjusting unit 25. The adjusting unit 25 adjusts the flow rate of the mixed steam supplied to each of the first stepped part Sa and the second stepped part Sb. The adjusting unit 25 is disposed between a branching part 22a from the first mixed steam supply pipe 21 and a connection part 22b to the casing 11, in the second mixed steam supply pipe 22. The adjusting unit 25 includes, for example, a butterfly valve (valve) 25v that changes the flow state of the steam that flows through the second mixed steam supply pipe 22. That is, the adjusting unit 25 is capable of adjusting the opening degree thereof. In addition, the adjusting unit 25 is not limited to being a valve capable of adjusting the flow state of the steam as in the present embodiment, and may be an on-off valve that completely opens or closes a flow path of the second mixed steam supply pipe 22.

The first mixed steam supply pipe 21 is provided with a check valve 27. The check valve 27 is disposed between the branching part 22a, and a connection part 21b of the first mixed steam supply pipe 21 to the casing 11. The check valve 27 allows the flow of the steam only in a direction from the first mixed steam supply pipe 21 toward the casing 11. Accordingly, the check valve 27 prevents a backflow of the steam from the inside of the casing 11 to the first mixed steam supply pipe 21.

The control unit 30 controls the adjusting unit 25 on the basis of a differential pressure between the pressure of the mixed steam supplied from the steam supply source 40 and the pressure in the first stepped part Sa within the casing 11. For this reason, the steam turbine system 1 includes a differential pressure gauge (detection unit) 31 that detects a differential pressure Pd between a pressure P0 of the mixed steam supplied from the steam supply source 40 and a pressure P1 within the casing 11 in the first stepped part Sa. The differential pressure gauge 31 outputs the detection result to the control unit 30. The differential pressure gauge 31 detects the pressure P0 of the mixed steam at a position upstream of the branching part 22a within the first mixed steam supply pipe 21.

The control unit 30 executes a control so as to widen (open) the opening degree in the adjusting unit 25 in a case where the differential pressure Pd detected by the differential pressure gauge 31 is smaller than a predetermined reference value Ps. That is, the control unit 30 adjusts the adjusting unit 25 so as to increase the flow rate of the steam supplied from the second mixed steam supply pipe 22 to the second stepped part Sb.

Additionally, the control unit 30 performs a control so as to narrow (close) the opening degree in the adjusting unit 25 in a case where the differential pressure Pd detected by the differential pressure gauge 31 is equal to or more than the predetermined reference value Ps. That is, the control unit 30 adjusts the adjusting unit 25 so as to reduce the flow rate of the steam supplied from the second mixed steam supply pipe 22 to the second stepped part Sb.

Figure 2:
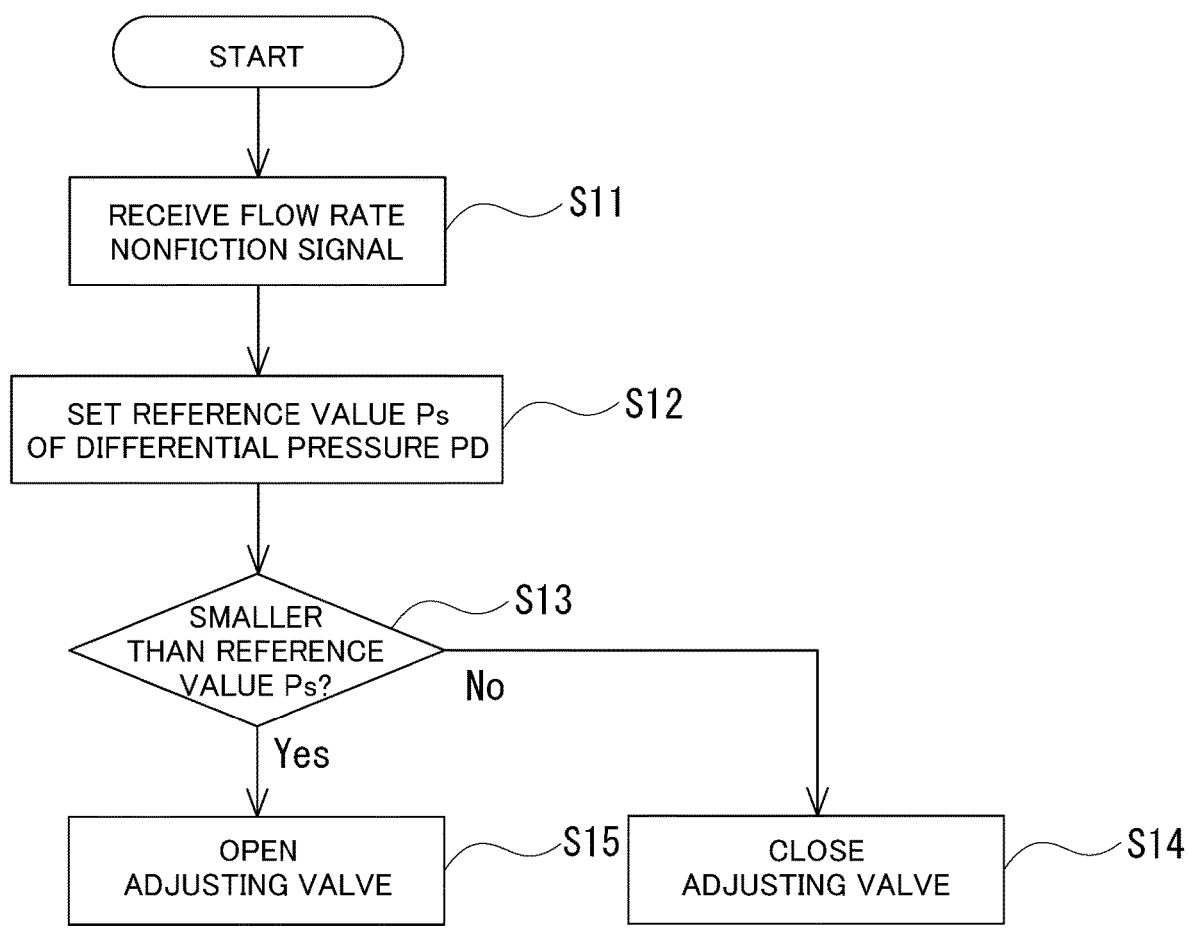
FIG. 2 is a flowchart showing a flow of processing of a mixed steam supply control method in the above steam turbine system.

Next, a mixed steam supply control method in the steam turbine system 1 in the control unit 30 will be described. FIG. 2 is a flowchart showing a flow of processing of the mixed steam supply control method in the steam turbine system in the present embodiment. As shown in FIG. 2, the control unit 30 receives a flow rate notification signal regarding the flow rate of the steam (mixed steam) supplied from the steam supply source 40 side to the steam turbine 10 (first Step S11).

Figure 3:
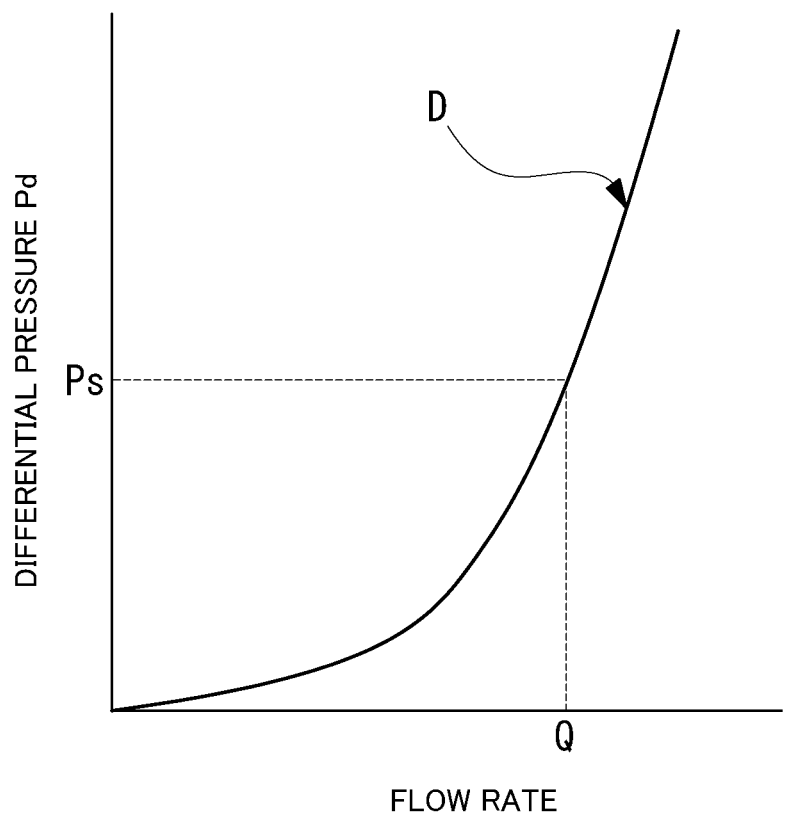
FIG. 3 is a view showing an example of correlation data used to set a reference value of a differential pressure in a control unit of the above steam turbine system.
Figure 4:
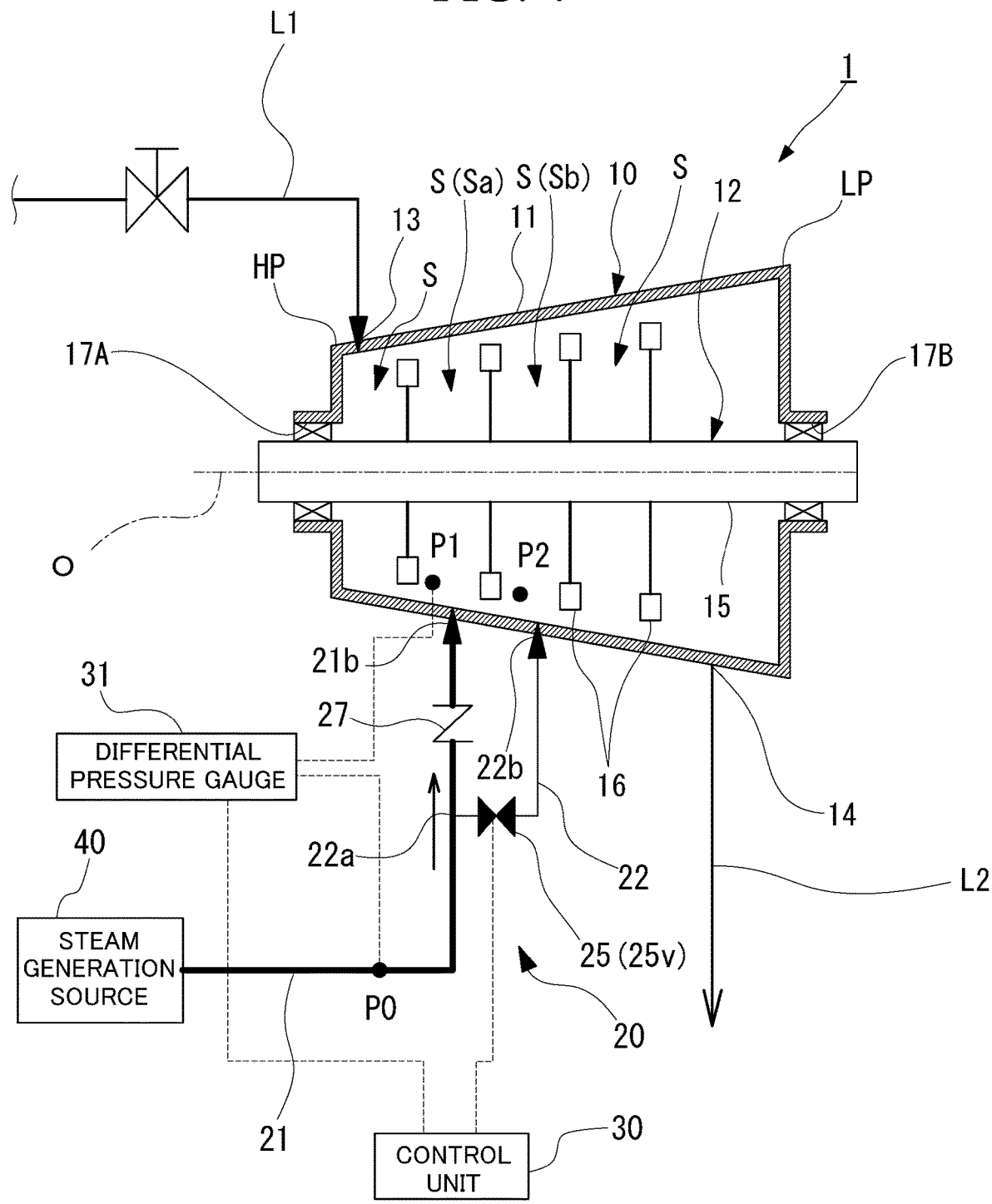
FIG. 4 is a view showing a flow of mixed steam in a state where an adjusting unit is closed in the steam turbine system in the above embodiment.
Figure 5:
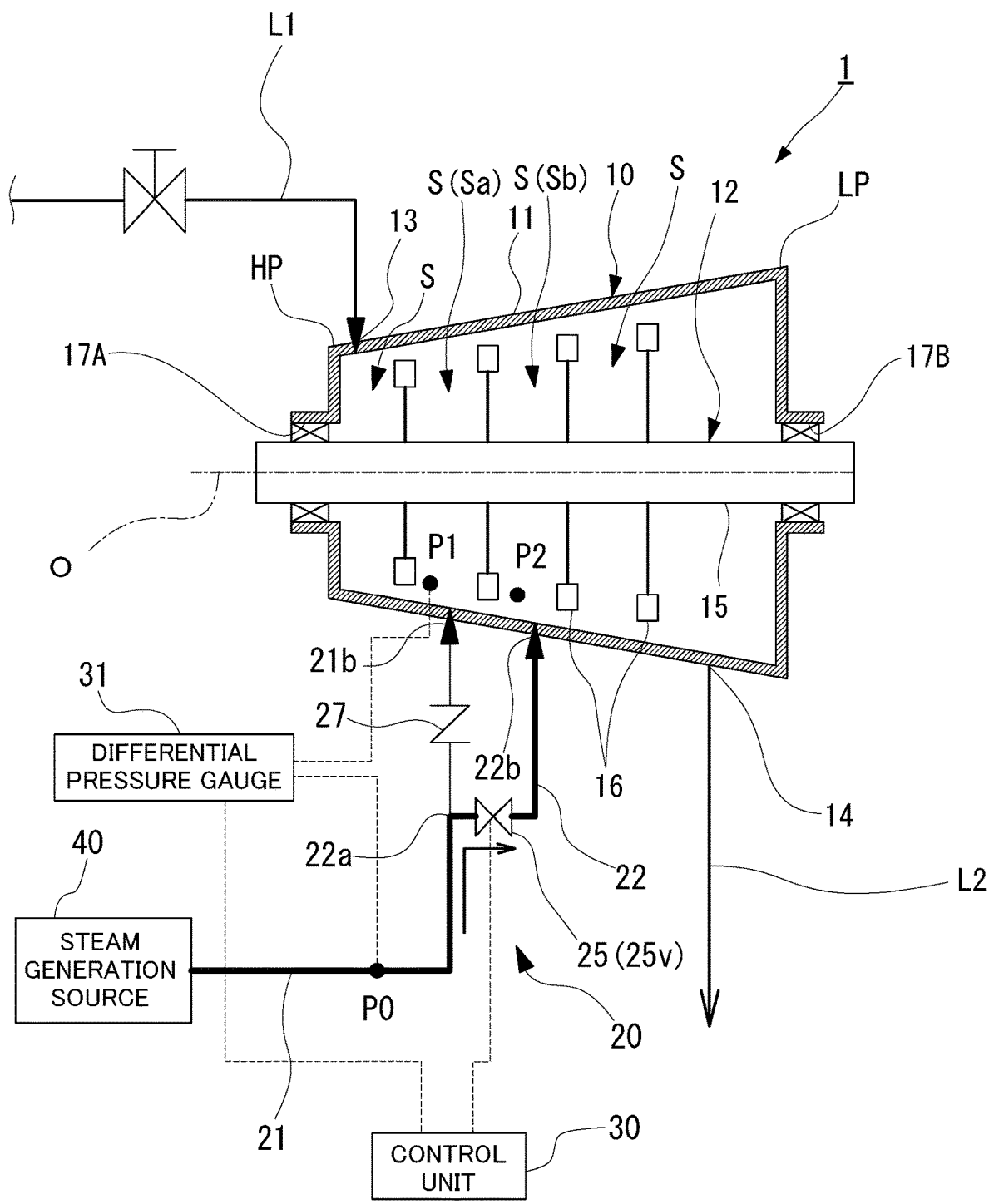
FIG. 5 is a view showing a flow of the mixed steam in a state where the adjusting unit is opened in the steam turbine system in the above embodiment.

FIG. 3 is a view showing an example of correlation data used to set the reference value of the differential pressure in the control unit of the steam turbine system in the present embodiment. FIG. 4 is a view showing a flow of the mixed steam in a state where the adjusting unit is closed in the steam turbine system in the present embodiment. FIG. 5 is a view showing a flow of the mixed steam in a state where the adjusting unit is opened in the steam turbine system in the present embodiment.

The control unit 30 sets the reference value Ps of the differential pressure Pd serving as a determination reference that controls the adjusting unit 25 if the flow rate notification signal is received (second Step S12). For example, correlation data D as shown in FIG. 3 is used. The correlation data D is stored in advance in the control unit 30. The correlation data D is data that is preset on the basis of a relationship between a flow rate Q of the mixed steam supplied from the steam supply source 40 and a differential pressure required to supply the mixed steam of the flow rate Q within the casing 11. The control unit 30 acquires the reference value Ps corresponding to the value of the flow rate Q of the mixed steam supplied from the steam supply source 40 side to the steam turbine 10 on the basis of the correlation data D. In addition, the flow rate Q of the mixed steam is included in the flow rate notification signal received in the first Step S11.

Next, the control unit 30 determines whether the differential pressure Pd is smaller than the reference value Ps detected by the differential pressure gauge 31 (third Step S13).

In a case where the differential pressure Pd is equal to or more than the reference value Ps, the control unit 30 closes the adjusting unit 25 (fourth Step S14). At that point, in a case where the adjusting unit 25 is closed, the control unit 30 causes the adjusting unit 25 to continue the closed state. As shown in HG. 4, if the mixed steam is supplied from the steam supply source 40 in a state where the adjusting unit 25 is closed, the mixed steam cannot flow through the second mixed steam supply pipe 22.

Therefore, the mixed steam is supplied only to the first stepped part Sa through the first mixed steam supply pipe 21. In this case, since the differential pressure Pd is equal to or more than the reference value Ps, the mixed steam supplied from the steam supply source 40 easily flows into the first stepped part Sa through the first mixed steam supply pipe 21.

In third Step S13, in a case where the differential pressure Pd is smaller than the reference value Ps, the control unit 30 opens the adjusting unit 25 (fifth Step S15). If the adjusting unit 25 is opened, the steam supply source 40 side and the second stepped part Sb within the casing 11 communicate with each other through the second mixed steam supply pipe 22. The pressure P2 of the second stepped part Sb located on the downstream side of the first stepped part Sa is lower than the pressure P1 in the first stepped part Sa. Accordingly, if the adjusting unit 25 is opened, the differential pressure Pd of the pressure P0 of the mixed steam supplied from the steam supply source 40 and the pressure P2 within the casing 11 in the second stepped part Sb increases. As a result, as shown in FIG. 5, the mixed steam supplied from the steam supply source 40 flows into the second mixed steam supply pipe 22 having a larger differential pressure Pd than on the first mixed steam supply pipe 21 side that communicates with the first stepped part Sa side. Accordingly, the flow rate of the mixed steam supplied from the second mixed steam supply pipe 22 to the second stepped part Sb increases. In practice, the mixed steam supplied from the steam supply source 40 flows into both of the first mixed steam supply pipe 21 and the second mixed steam supply pipe 22 temporarily immediately after the adjusting unit 25 is opened. Thereafter, in a short time, almost the whole amount of the mixed steam supplied from the steam supply source 40 flows into the second stepped part Sb with a larger differential pressure Pd through the second mixed steam supply pipe 22. In this way, even if the differential pressure Pd is smaller than the reference value Ps, the mixed steam supplied from the steam supply source 40 easily flows into the casing 11.

The control unit 30 repeatedly executes the above series of processing at predetermined time intervals while the steam turbine system 1 is operating. The control unit 30 stops the above series of processing if the operation of the steam turbine system 1 is stopped.

According to the steam turbine system 1 as described above, it is possible to adjust whether a mixed steam supply destination is the first stepped part Sa or the second stepped part Sb on the basis of the differential pressure Pd between the pressure P0 of the mixed steam supplied from the steam supply source 40 and the pressure within the casing 11 in the first stepped part Sa. The second stepped part Sb of the pressure within the casing 11 is lower than the first stepped part Sa. Therefore, in the second stepped part Sb, the differential pressure Pd from the pressure P0 of the mixed steam supplied from the steam supply source 40 becomes larger than the first stepped part Sa. Hence, in a case where the differential pressure Pd between the pressure P0 of the mixed steam supplied from the steam supply source 40 and the pressure P1 in the first stepped part Sa is small, the mixed steam easily flows into the casing 11 if the amount of the mixed steam supplied to the second stepped part Sb is increased.

On the other hand, if the differential pressure Pd between the pressure P0 of the mixed steam supplied from the steam supply source 40 and the pressure P1 in the first stepped part Sa is sufficiently large, the mixed steam flows into the casing in the first stepped part Sa. In this case, by supplying the mixed steam to the first stepped part Sa on the upstream side of the second stepped part Sb, the amount of work by the mixed steam within the casing 11 can be increased, and the work efficiency of the steam turbine 10 can be enhanced. In this way, even if the pressure of the mixed steam supplied from the steam supply source 40 fluctuates, it is possible to smoothly perform supply of the mixed steam and to perform the efficient operation.

Additionally, according to the steam turbine system 1, the adjusting unit 25 is the butterfly valve 25v that switches the flow state of the steam in the second mixed steam supply pipe 22. By having such a configuration, by closing the adjusting unit 25, the second mixed steam supply pipe 22 is blocked, and the mixed steam is supplied to the first stepped part Sa through the first mixed steam supply pipe 21. On the contrary, by opening the adjusting unit 25, the second mixed steam supply pipe 22 is opened, and the mixed steam is supplied to the second stepped part Sb with low pressure through the second mixed steam supply pipe 22. In this way, the switching of the mixed steam supply destination based on the differential pressure Pd can easily be performed by a simple configuration including the butterfly valve 25v. As a result, the flow rate adjusting function of the mixed steam to the first stepped part Sa and the second stepped part Sb in the adjusting unit 25 can be easily realized.

Additionally, according to the steam turbine system 1, the first mixed steam supply pipe 21 is provided with the check valve 27 that prevents the backflow of the steam from the inside of the casing 11. Therefore, while the mixed steam is made to flow into the second stepped part Sb through the second mixed steam supply pipe 22, outflow (backflow) of the steam from the first stepped part Sa having a higher pressure than the second stepped part Sb via the first mixed steam supply pipe 21 to the second stepped part Sb can be suppressed.

Additionally, a case where the differential pressure Pd between the pressure P0 of the mixed steam supplied from the steam supply source 40 and the pressure in the first stepped part Sa is small and the mixed steam does not easily flow into the first stepped part Sa can be appropriately determined. Also, the mixed steam supply destination is switched from the first stepped part Sa to the second stepped part Sb. As a result, the mixed steam can be supplied to the second stepped part Sb, and the mixed steam can be caused to efficiently flow into the casing 11.

Additionally, according to the steam turbine system 1, the reference value Ps is determined on the basis of the preset correlation data D. Therefore, it is possible to secure a differential pressure required to supply the mixed steam into the casing 11 with high precision so as to be equal to or more than the reference value Ps, depending on the flow rate of the mixed steam supplied from the steam supply source 40. Accordingly, the mixed steam supplied from the steam supply source 40 can be caused to smoothly flow (supplied) into the casing 11.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, a bleed nozzle, which bleeds the steam within the casing 11 in addition to the mixed steam, may be provided on the upstream side of the first mixed steam supply pipe 21 in the steam turbine 10. Even if the pressure within the casing 11 fluctuates due to the bleeding in the bleed nozzle, the control unit 30 performs a control on the basis of the differential pressure Pd detected by the differential pressure gauge 31. Therefore, it is possible to perform suitable mixed steam supply irrespective of the influence of the bleeding.

EXPLANATION OF REFERENCES

1: steam turbine system
10: steam turbine
11: casing
12: rotor
13: steam inlet
14: steam outlet
15: rotating shaft
16: rotor blade
17A: first bearing
17B: second bearing
20: mixed steam supply unit
21: first mixed steam supply pipe
21*b*: connection part
22: second mixed steam supply pipe
22*a*: branching part
22*b*: connection part
25: adjusting unit
25*v*: butterfly valve (valve)
27: check valve
30: control unit
31: differential pressure gauge (detection unit)
40: steam supply source
D: correlation data
HP: high-pressure side
L1: steam supply line
L2: steam discharge line
LP: low-pressure side
O: central axis
P0: pressure of mixed steam supplied from mixed steam generation source
P1: pressure within casing in first stepped part
P2: pressure within casing in second stepped part
Pd: differential pressure
Ps: reference value
Q: flow rate S: stepped part
Sa: first stepped part (upstream stage)
Sb: second stepped part (downstream stage)
S11: first step
S12: second step
S13: third step
S14: fourth step
S15: fifth step

What is claimed is:

1. A steam turbine system comprising:
   a steam turbine including a plurality of rotor blades that are configured to rotate around a rotating shaft with steam within a casing and are arranged at intervals in a central axis direction of the rotating shaft so as to form a plurality of stages;
   a first mixed steam supply pipe that is configured to supply the steam, which is supplied from a steam supply source allowing supply of the steam with fluctuating pressure, to an upstream stage within the casing;
   a second mixed steam supply pipe that is provided to branch from the first mixed steam supply pipe and is configured to supply the steam to a downstream stage located on a downstream side with respect to the upstream stage within the casing;
   an adjusting unit that is configured to adjust a flow rate of the steam supplied from the first mixed steam supply pipe to the upstream stage and a flow rate of the steam supplied from the second mixed steam supply pipe to the downstream stage;
   a detection unit that is configured to detect a differential pressure between a pressure of the steam supplied from the steam supply source and a pressure in the upstream stage; and
   a control unit that is configured to control the adjusting unit on the basis of the differential pressure detected by the detection unit, wherein
   the control unit is configured to control the adjusting unit so as to increase the flow rate of the steam supplied from the second mixed steam supply pipe to the downstream stage in a case where the differential pressure is smaller than a predetermined reference value, and
   the reference value is determined on the basis of correlation data that is preset on the basis of a relationship between a flow rate of the steam supplied from the steam supply source and a differential pressure required to supply the steam of the flow rate into the casing.

2. The steam turbine system according to claim 1, wherein the adjusting unit is a valve that is configured to switch a flow state of the steam that flows through the second mixed steam supply pipe.

3. The steam turbine system according to claim 1, further comprising:
   a check valve that is provided in the first mixed steam supply pipe to prevent a backflow of the steam from an inside of the casing.

4. The steam turbine system according to claim 2, further comprising:
   a check valve that is provided in the first mixed steam supply pipe to prevent a backflow of the steam from an inside of the casing.

* * * * *